United States Patent [19]

Strobel et al.

[11] Patent Number: 4,778,383
[45] Date of Patent: Oct. 18, 1988

[54] APPARATUS FOR FIRING CERAMIC SHAPED PRODUCTS

[75] Inventors: Klaus Strobel; Hans-Jürgen Pohlmann, both of Selb, Fed. Rep. of Germany

[73] Assignee: Hutschenreuther AG, Selb, Fed. Rep. of Germany

[21] Appl. No.: 89,958

[22] Filed: Aug. 25, 1987

Related U.S. Application Data

[63] Continuation of Ser. No. 836,259, Mar. 5, 1986, abandoned.

[30] Foreign Application Priority Data

May 31, 1985 [DE] Fed. Rep. of Germany ....... 3519612

[51] Int. Cl.$^4$ .......................... F27D 3/12; F27D 5/00
[52] U.S. Cl. ..................... 432/241; 432/258; 432/259; 264/57
[58] Field of Search ............ 432/241, 253, 258, 259; 264/57-59

[56] References Cited

U.S. PATENT DOCUMENTS

| | | | |
|---|---|---|---|
| 1,893,123 | 1/1933 | Beth | 432/241 |
| 2,207,412 | 7/1940 | Pronty | 432/241 |
| 2,512,567 | 6/1950 | Milligan | . |
| 3,614,076 | 10/1971 | Schmidt | 432/241 |
| 3,768,963 | 10/1973 | Walker et al. | 432/259 |
| 3,997,289 | 12/1976 | Bowers | 432/241 |
| 4,421,481 | 12/1983 | Holz et al. | 432/241 |
| 4,462,798 | 7/1984 | Foster | 432/259 |
| 4,475,887 | 10/1984 | Foster et al. | 432/258 |
| 4,487,578 | 12/1984 | Wakins et al. | 432/241 |
| 4,564,489 | 1/1986 | Welzen et al. | 432/258 |

FOREIGN PATENT DOCUMENTS

| | | |
|---|---|---|
| 2121741 | 11/1972 | Fed. Rep. of Germany . |
| 2140282 | 2/1973 | Fed. Rep. of Germany . |
| 7623792 | 9/1976 | Fed. Rep. of Germany . |
| 7506348 | 11/1979 | Fed. Rep. of Germany . |
| 2906387 | 11/1979 | Fed. Rep. of Germany . |
| 2848302 | 5/1980 | Fed. Rep. of Germany . |
| 2939437 | 4/1981 | Fed. Rep. of Germany . |
| 3010026 | 9/1981 | Fed. Rep. of Germany . |
| 8415460 | 10/1984 | Fed. Rep. of Germany . |
| 3421365 | 5/1985 | Fed. Rep. of Germany . |
| 2209344 | 6/1974 | France . |
| 0766455 | 1/1957 | United Kingdom . |
| 1486838 | 9/1977 | United Kingdom . |
| 2010459 | 6/1979 | United Kingdom . |
| 2024386 | 1/1980 | United Kingdom . |
| 2138115 | 10/1984 | United Kingdom . |
| 2161253 | 1/1986 | United Kingdom . |
| 2161252 | 1/1986 | United Kingdom . |

Primary Examiner—Henry C. Yuen
Attorney, Agent, or Firm—Toren, McGeady & Associates

[57] ABSTRACT

An apparatus for firing ceramic shaped products, particularly porcelian tableware, comprising a kiln provided with a through tunnel and a heating device, gridlike pallets for holding the shaped products during their passage through the through tunnel, feed means for feeding the unfired shaped products onto the pallets, and discharge means for discharging the fired shaped products from the pallets. The pallets are covered with product holder plates, preferably plane parallel product holder plates, adapted approximately to the format of the respective shaped products. More uniform action of the firing atmosphere on the shaped products is thereby acheived. The product holder plates are more easily produced than the kiln furniture hitherto used.

26 Claims, 5 Drawing Sheets

APPARATUS FOR FIRING CERAMIC SHAPED PRODUCTS

This is a continuation of application Ser. No. 836,259, filed Mar. 5, 1986 now abandoned.

BACKGROUND OF THE INVENTION

1. Field of the Invention

The invention relates to an apparatus for firing ceramic shaped products, e.g. procelain tableware.

2. Description of the Prior Art

Previously suggested apparatus of this kind has not permitted sufficiently rapid firing or close packing of the shaped products during firing.

The object of the present invention is therefore to provide an apparatus in which increased action of the firing atmosphere on the shaped products is possible so as to effect rapid firing, e.g. in eight hours, while nevertheless permitting close packing in the sense of the best possible utilization of the power of the kiln employed.

SUMMARY OF THE INVENTION

According to the present invention, there is provided apparatus for firing ceramic shaped products comprising a kiln provided with a through tunnel and a heating device, grid-like pallets for holding the shaped products during their passage through the through tunnel, the pallets being adapted to be covered with product holder plates which approximately match the format of the shaped products in question, feed means for feeding the unfired shaped products onto the pallets, and discharge means for discharging the fired shaped products from the pallets.

If the shaped products stand on product holder plates adapted to their format, this means that there is no longer a closed covering on the pallet and that the firing atmosphere also reaches the shaped products more intensively from below.

The product holder plates should preferably be plane parallel by reason of the nature of the production of the product holder plates.

The product holder plates are preferably so dimensioned that each of them is intended to hold a single shaped product. This means that as a rule a plurality of shaped products will not stand side by side on a product holder plate, and that in particular a plurality of products will not be stacked one above the other. The arrangement of a plurality of shaped products side by side on a single product holder plate would have the consequence that the action of the firing atmosphere on all sides would no longer be fully ensured. The arrangement of a plurality of shaped products one above the other on a product holder plate would have the consequence that complicated kiln furniture, particularly containers or racks, would have to be used, which are not so simple to produce as plates, particularly plane parallel plates.

The product holder plates can be approximately placed with their outer contour against the contour of a foot of the respective shaped product. Since the contour of the foot is often smaller than the outside contour, for example in the case of plates or dishes, this means that the product holder plates can be made smaller than the shaped products carried by them. This additionally improves the action of the firing atmosphere on the shaped products.

The product holder plates may be annular in shape, so that the shaped products can also be acted on by the firing atmosphere in their central region, that is to say inside the foot. Furthermore, annular product holder plates have the advantage that, with the same surface pressure per unit of surface, they can be moulded with a smaller mould closing force than corresponding product holder plates having a solid surface.

The inner contour of annular product holder plates will also as far as possible be adapted to the contour of the foot of the shaped product in each particular case, in order to be able to keep the lumen of the ring as large as possible, for the reasons given below. When mention is made here of the adaptation of the outer contour and, where applicable, of the inner contour of product holder plates to the shaped products in question, this is always to be understood with the proviso that compromises must be made in order not to have to stock too many formats of product holder plates. For example, one can manage with a total of three product holder plates for the different plate sizes occurring in domestic and hotel procelain tableware.

For round shaped products use will as far as possible be made of round product holder plates, and for oval shaped products oval product holder plates will as far as possible be used, and so on. The contour of the product holder plates will thus be approximately adapted to the contour of the respective shaped product, in order to ensure the greatest and most uniform firing action possible on the shaped products.

With an assortment of circular and circular-annular product holder plates it will be possible, as a compromise, to fire most shaped products occurring in practice.

With a view to the optimum utilization of the kiln, as is necessary because of the cost of producing and operating it, one should preferably attempt to lay the product holder plates on the pallet in such a manner that the largest possible number of shaped products can be accommodated in one plane. If only shaped products of the same format, that is to say of the same shape and same dimensions, are to be fired on one and the same pallet, the arrangement permitting the maximum number of shaped products to be accommodated should be determined by simple geometrical means. If, on the other hand, different shaped products are to be fired on one and the same pallet, optimum maximum filling of a pallet may in certain circumstances be achieved by a mixed distribution of the different formats over the surface of the pallet. It may therefore even be advantageous, from the point of view of maximum loading of the surface of the pallet, to fire different formats on one and the same pallet; for example, it may be conceivable for a cup to be placed in the centre of each four plates.

In an apparatus according to the invention the pallet is preferably supported like a bridge on two pallet carrier trucks each of which runs near a side boundary wall of the through tunnel, these trunks each consisting of a wheeled chassis and a refractory body. In order to protect the chassis, the refractory body of the pallet carrier truck may adjoin a central refractory structure between the pallet carrier trucks and may also adjoin refractory structures on the side walls of the kiln, this arrangement forming a heat shield. This arrangement is particularly suitable because a great pallet width can thus be achieved without the hot refractory mass, which has to be removed from the through tunnel every time a firing operation is completed becoming excessively great. Together with each pallet, in fact, only the refractory mass of the pallet carrier trucks, which can be relatively small, has to be run out, while the central refractory body can in this operation remain in the through tunnel of the kiln. In respect of energy economy this is of great advantage. The apparatus according to the invention may require a great through tunnel width to achieve a high kiln output, because the shaped products are not stacked on the platform. If, however, a stationary central refractory structure is provided, this great kiln width can be achieved without the disadvantage of poorer energy economy.

At the same time the central refractory structure may be in the form of a part of a plurality of tunnel bottom carrier trucks, each of which has a tunnel bottom carrier chassis. This is found advantageous because in the event of a defect in one of the pellet carrier trucks, or in the pallet itself, the defective point can more easily be made accessible by removing the tunnel bottom carrier trucks as far as the defective point.

A pallet can be formed on the one hand of bridge beams which extend from one pallet carrier truck to the other, and on the other hand of connecting beams which extend in the longitudinal direction of the through tunnel between each two successive bridge beams, while the product holder plates can be laid on the connecting beams. In view of the high temperature load, and particularly in view of the high temperature change load caused by the rapid firing, it is advisable for a pallet to be constructed from material comprising sintered and/or recrystallized silicon carbide. In this case it should be observed that parts of recrystallized silicon carbide are not in themselves as good, in respect of their stability under high temperature loads, particularly high temperature change loads, as sintered silicon carbide parts, particularly sintered silicon carbide parts which are not sintered under pressure, which have a density by volume approximately equal to the respective density of silicon carbide. On the other hand, however, large parts, for example beams, can more easily be made of recrystallized silicon carbide than from sintered silicon carbide which is not sintered under pressure.

The bridge beams and/or the connecting beams may be in the form of hollow sections, which is advantageous from the point of view of manufacturing technique.

The product holder plates are likewise preferably of silicon carbide, which is known per se for the production kiln furniture.

In view of the high temperature load and temperature change load during rapid firing, it is advisable for the product holder plates to be made of silicon carbide sintered without pressure at at least 2,000° C. and previously pressed isostatically or quasi-isostatically, preferably at at least 1,500 bars. This material also has a density by volume approximately corresponding to the respective density of silicon carbide, and is found to be extremely resistant to temperature change loads such as are to be expected in rapid firing processes. Pressing at 1,500 bars is a considerable technique problem. The solution of this problem is facilitated if the plates are, as previously mentioned, approximately plane parallel plates, and in any case is substantially simpler than the pressing of containers. The product holder plates produced in this manner have high resistance to oxidation because of the high density, and this is the reason for their stability under load during the firing. It has been found that the product holder plates produced in this manner can survive up to 1,500 rapid firing cycles, in contrast to conventional containers or ceramically bound silicon carbide which were fired at a temperature of about 1,450° C. and, when used in conventional tunnel kilns, survived about 200 cycles of 40 hours each.

At this point it must be repeated what is to be understood in particular by a rapid firing cycle in the sense of the invention: it is a ONE-firing rapid firing process which last about 8 hours. The temperature profile of a ONE-firing rapid firing process of this kind will be described further in the course of the description of an example given below. In a ONE-firing rapid firing process of this kind, the tableware pressed from powder material, optionally decorated and glazed in the raw state, in particular electrostatically glazed, is completely fired in a single firing lasting about 8 hours. This process is to be distinguished from a firing process, which is also known as a "rapid firing process", in which plates, which have first been bisque-fired and then glazed, are finally fired in a further glost firing. In this known "rapid firing process", the two firings—the bisque-firing and the final firing, may in certain circumstances be even shorter than 8 hours.

The width of the through tunnel, the importance of which has been indicated above, may be at least 2,000 mm, preferably 2,400 mm. The upper limit for the width is given by the flex resistance of the bridge beams forming the platform, which in accordance with the present state of the art are made of recrystallized silicon carbide.

The clear height of the through tunnel above the pallet will be selected so that, with a single layer of shaped products on the pallet and with lateral heating by the side walls of the kiln, an approximately uniform firing atmosphere distribution in the entire through tunnel cross-section can be achieved. In order to obtain such a homogenous firing atmosphere distribution over the entire cross-section of the tunnel, it is advantageous for the table were to be disposed in only a single layer on the pallet. When mention is made here of a homogeneous firing atmosphere over the cross-section, this is intended to refer in particular to a homogeneous temperature distribution but also to a homogeneous chemical composition of the firing atmosphere. For example, in the apparatus according to the invention a reducing atmosphere with a carbon monoxide content of 4 to 6% CO can be maintained over the entire cross-section. A reducing atmosphere of this kind is desired for the purpose of obtaining particularly white tableware. This white tableware is obtained by effecting crash cooling after it has passed through a reducing atmosphere containing from 4 to 6% CO. This has the consequence that the less highly oxidized iron oxide components formed in the reducing atmosphere are "frozen"; in other words, the equilibrium between the less highly oxidized and the more highly oxidized iron oxide components, which because of the reducing atmosphere has been displaced in the direction of the less highly oxidized components, is "frozen". The less highly oxidized iron oxide components, particularly the FeO, are of course responsible for the white coloration, in contrast to the more highly oxidized iron oxide components, such as in particular the $Fe_2O_3$, which lead to a yellowish coloration.

The pellets may be movable along an annular path extending through the through tunnel. In this case, the feed means and the discharge means may lead to a stretch of the annular path outside the through tunnel.

The single-layer arrangement of the shaped products on the pallet complies with advantageous prerequisites for mechanized loading and unloading. For this reason the feed and discharge means may be in the form of feed and discharge conveyors leading to the annular path, and at the ends of these feed and discharge conveyors facing the annular path there may be provided, in each case, at least one program-controlled manipulator for transfer between the conveyors and the pallet. The preparation of a program of this type is particularly advantgeous when identical charges of products are to be fired in succession. The product holder plates can remain on the pallet for repeated circulation if identical charges are to be fired one after the other on the same pallet.

The replacement of the product holder plates can also be automated.

For a uniform action of the firing atmosphere on the shaped products it is advisable for the heating system to comprise burners adjusted horizontally and transversely to the longitudinal direction of the through tunnel and disposed both above and below the pallets.

BRIEF DESCRIPTION OF THE DRAWINGS

The invention is illustrated, merely by way of example, in the accompanying drawings, in which.

Terms such as "left" and "right", as used in the description below, are to be understood to refer to directions as seen in the accompanying drawings.

DETAILED DESCRIPTION OF THE PREFERRED EMBODIMENTS

Figure 1:
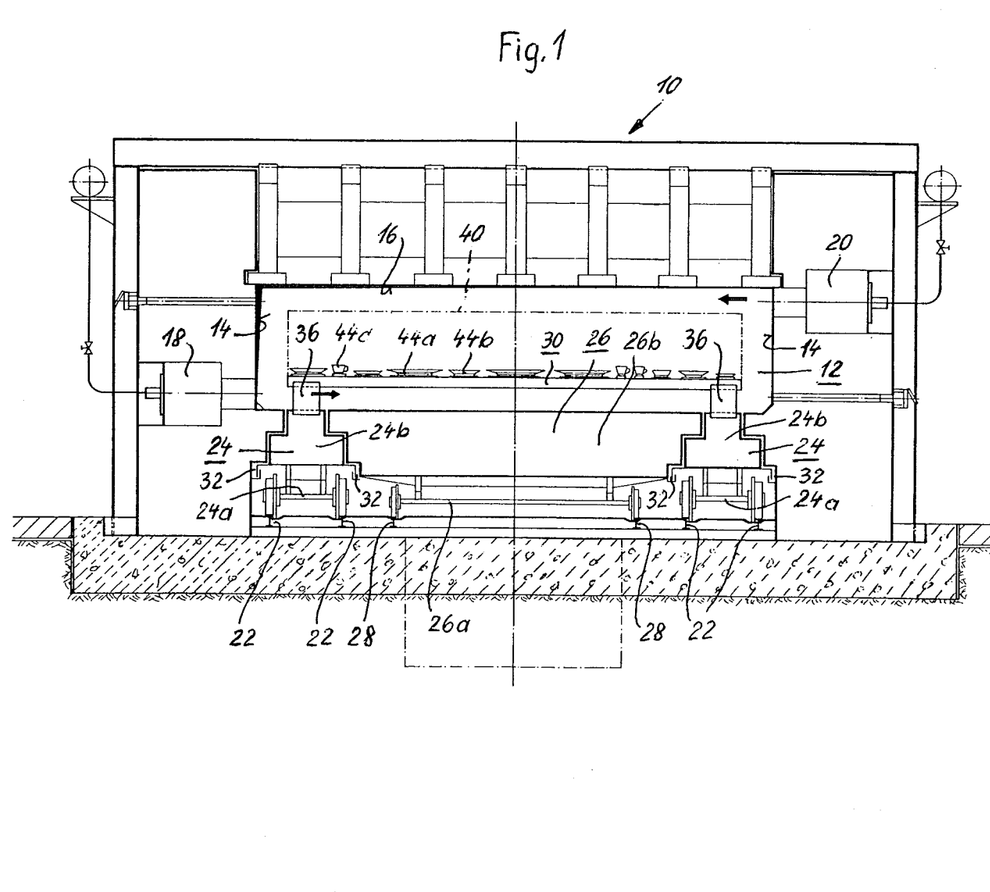
FIG. 1 is an end view of a kiln provided in an apparatus according to the present invention.

In FIG. 1 can be seen a kiln which is given the very general reference 10 and which has a through tunnel 12. The through tunnel 12 is bounded by side walls 14 and a roof 16. A bottom horizontally directed burner 18 extends through the left-hand side wall 14, while an upper burner 20, directed horizontally and transversely to the longitudinal direction of the tunnel, extends through the right-hand side wall 14. Close to each of the side walls 14 a pallet carrier truck 24 is adapted to run on respective double tracks 22, the truck 24 consisting of a wheeled chassis 24a and a refractory body 24b. Between the pallet carrier trucks 24 is disposed a tunnel bottom carrier truck 26, which consists of a wheeled chassis 26a and a central refractory body 26b and which is adapted to run on another double track 28. A plurality of bridge carrier trucks 24 and tunnel bottom carrier trucks 26 are disposed one behind the other in the longitudinal direction of the through tunnel 12. The tunnel bottom carrier trucks 26 remain continuously in the through tunnel 12 in normal operation, while the bridge carrier trucks 24, together with the respective pallets 30 carried by them, run into the through tunnel 12 at one end and run out of the through tunnel 12 at the other end. Between the refractory bodies 24b of the pallet or bridge carrier trucks 24 on the one hand, and the side walls 14 and the central refractory body 26b on the other hand, labyrinth gaps are formed, each of which is covered at the bottom by a conventional sand seal 32.

Figure 3:
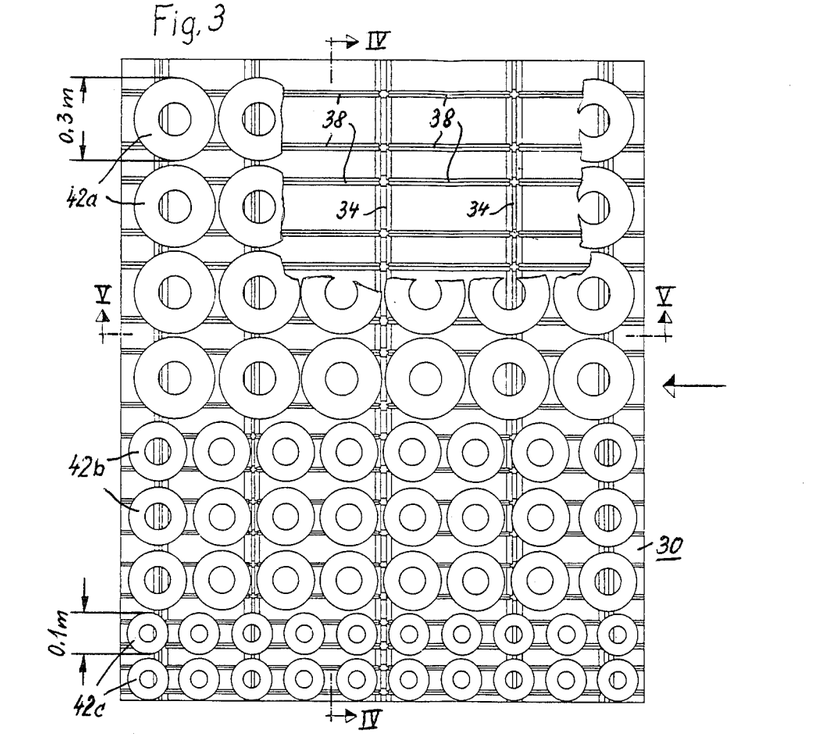
FIG. 3 is a plan view of a pallet carrying product holder plates.
Figure 4:
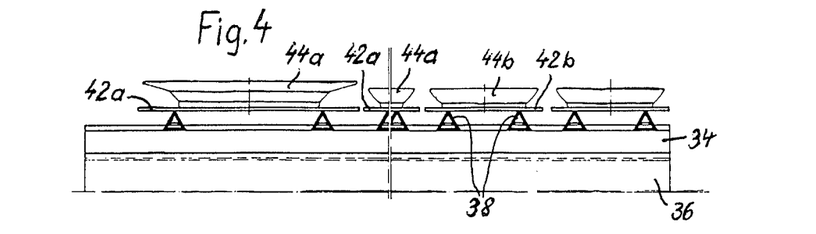
FIG. 4 is a section on the line IV—IV in FIG. 3.
Figure 5:
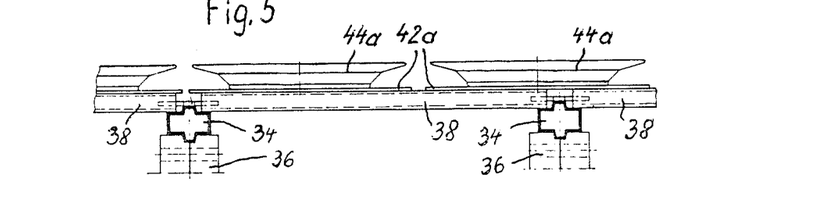
FIG. 5 is a section on the line V—V in FIG. 3.

The pallets 30 are shown in FIGS. 3, 4 and 5. They consist of bridge beams 34, which extend between supports 36 of oppositely disposed bridge carrier trucks, and of connection beams 38 which extend between each two successive bridge beams 34. The bridge beams 34 are hollow sections of recrystallized silicon carbide, while the connection beams are hollow sections of sintered silicon carbide, namely of compact silicon carbide sintered without pressure. The space available for the firing operation is indicated in dot-dash lines in FIG. 1.

Circular annular product holder plates 42a, 42b and 42c of different sizes stand free on the pallet 30, the distances between the connection beams 38 being made such that the product holder plates, including the small ones, all have stable support. The product holder plates 42a to 42c are plane parallel; they are isostatically pressed from silicon carbide at about 1,500 bars, and are then sintered without pressure at a temperature above 2000° C.; their density by volume corresponds approximately to the theoretical density of silicon carbide. They have high resistance to oxidation. The product carrier plates are distributed on the surface of the pallet 30 in such a manner that a maximum number of shaped products is accommodated on the pallet in one layer. The arrangement of the shaped products 44a, 44b, 44c on the product holder plates is shown in FIGS. 4 and 5. It can be seen that the outer contours of the shaped products 44a to 44c correspond approximately to the outer contours of the product carrier plates 42a to 42c, while the foot diameter of the shaped products 44a to 44c is slightly larger than the inside diameter of the product holder plates 42a to 42c.

Figure 2:
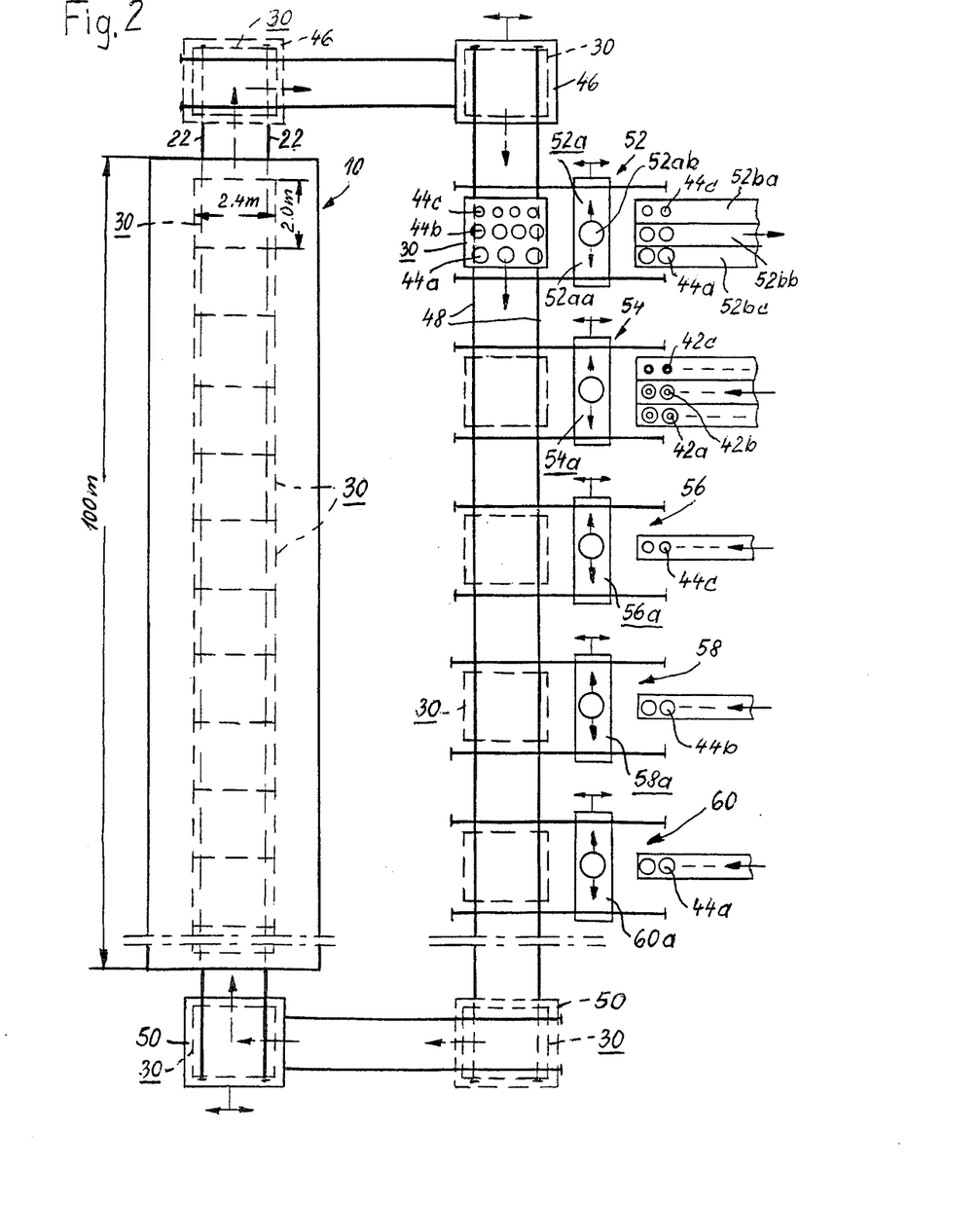
FIG. 2 is a diagrammatical plan view of the apparatus according to the invention.

As shown in FIG. 2, the pallets 30 pass through the kiln 10 in the longitudinal direction. At the end of the kiln 10 the pallets, together with their pallet carrier trucks 24, pass onto a cross-displacement platform 46, with the aid of which they are transferred to a return track 48. At the end of the return track 48 there is provided another cross-displacement platform 50, which effects the transfer of the pallets, together with the bridge carrier trucks, from the track 48 to the track 22. In this way a closed annular path 22, 46, 48, 50 is formed for the pallets 30.

To give an idea of size, it may be stated that the length of the kiln amounts for example to 100 meters, and that the pallet has a length of about 2.0 meters in the longitudinal direction of the kiln, with a width of about 2.4 meters in the direction of the width of the kiln. The product holder plates have a diameter of between 0.3 meter (product holder plates 42a) and 0.1 meter (product holder plate 42c).

Along the track 48 are disposed a discharge station 52 for discharging fired products, an exchange station 54 for replacing product holder plates, and feed stations 56, 58, 60 for feeding shaped products. A manipulator 52a, 54a, 56a, 58a and 60a respectively is associated with each of these stations. The manipulator 52a comprises a manipulator bridge 52aa and a manipulator head 52ab, each of which is movable in the direction of the double arrow shown for it. The manipulator bridge 52aa can, on the one hand, move over the entire width of a pallet 30 in the station 52, and, on the other hand, can move over the end of the discharge conveyors 52ba to 52bc, while the manipulator head 52ab can move over all three discharge conveyors 52ba to 52bc and over the entire length of a pallet 30 in the station 52. The drives of the manipulator head 52ab and of the manipulator bridge 52aa are so constructed that any position on the pallet 30 can be reached, so that the pallet 30 can be covered with maximum density irrespective of the shaped product program in question. Loading and removal by the manipulator head are effected in dependence on a main program controlling the entire plant, or on a subprogram, the programming being effected in a simple manner in such a way that after a pallet has been loaded with a tableware program with the desired distribution, the manipulator head 52ab is in succession adjusted by hand to the individual positions, these positions are recorded in coordinate form by cooresponding measurements, and the resulting coordinate values are stored in the respective memory by pressing a button. The manipulators 54a, 56a, 58a, and 60a work similarly. It is obvious that the manipulator 54a is not operated at all if all the circulating pallets are for a long period of time run with an unchanged loading program.

Figure 6:
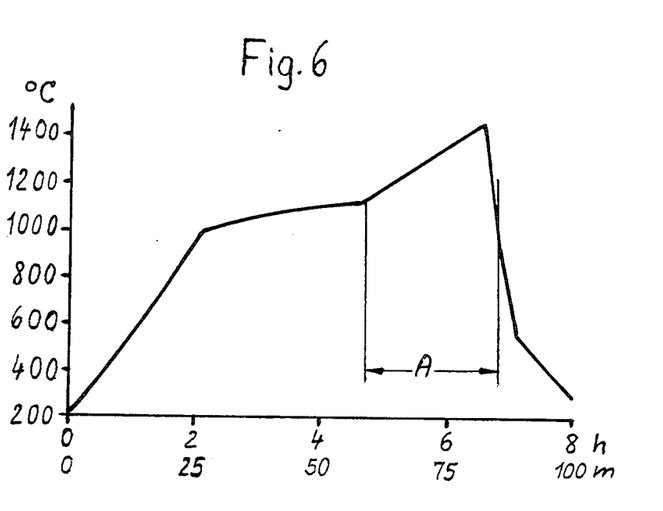
FIG. 6 is a graph showing the temperature profile along the kiln shown in FIGS. 1 and 2.

As they pass through the through tunnel, the pallets 30 are subjected to a tempeaure program, which is shown in FIG. 6. This temperature program shown in FIG. 6 remains constant in time, while the pallets moving continuously or stepwise through the through tunnel 12 pass in succession into the zones of different temperatures in accordance with FIG. 6. In zone A in FIG. 6 a reducing atmosphere with a CO content of 4 to 6% (weight percent) is maintained. This atmosphere is distributed fairly homogeneously over the entire cross-section of the through tunnel 12 in accordance with FIG. 1; because of the single-layer arrangement of the shaped products in this cross-section, this is possible without difficulty. After passing through this zone A, the products being fired pass into a temperature plunge region, as shown in FIG. 6. The less highly oxidized iron oxide components of the glaze (FeO) produced in the reducing atmosphere result in a white coloration. Because of the crash cooling the less highly oxidized iron oxide components are "frozen", or, more correctly expressed, an equilibrium between the less highly oxidized and the more highly oxidized iron oxide components, whic is displaced in the direction of the less highly oxidized components, is "frozen". The product holder plates 42a to 42c can survive up to 1,500 rapid firing cycles according to FIG. 6.

Figure 7:
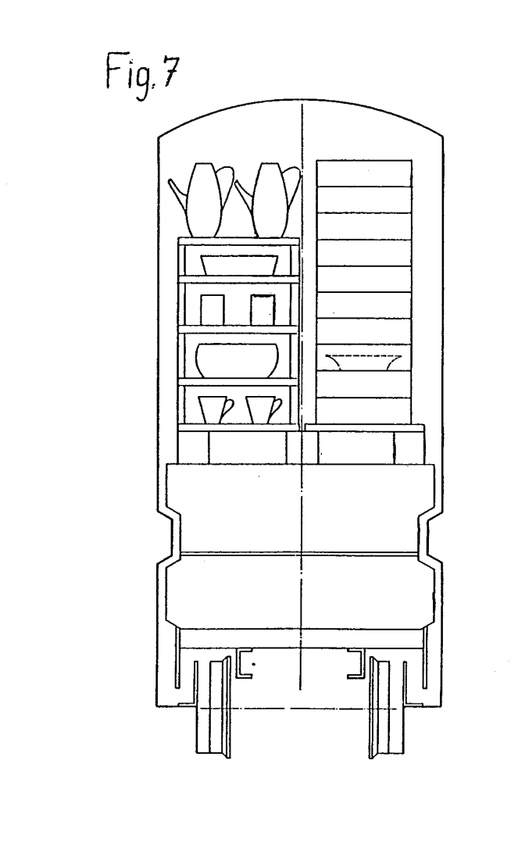
FIG. 7 shows an end view of a known tunnel kiln.
Figure 8:
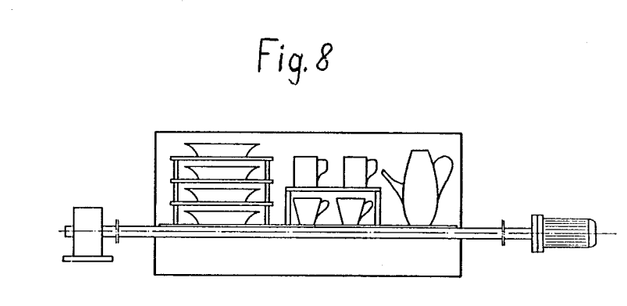
FIG. 8 shows an end view of a known roller type continuous kiln.

In contrast to the present invention, FIG. 7 shows an end view of a known tunnel kiln in which the flat tableware is accommodated in containers and other tableware is placed on racks, while FIG. 8 shows a known arrangement in which the through tunnel has rotating shafts passing through it, these shafts driving pallets carrying the ware on racks.

We claim:

1. Apparatus for firing ceramic shaped products comprising a kiln (10) provided with a through tunnel (12) and heating means (18, 20) for heating and providing a firing atmosphere, grid-like pallets (30) having a support surface carrying the ceramic shaped products (44a–44c) during the passage of the pallets through the through tunnel (12) and said support surface having openings therethrough so that the firing atmosphere flows through the openings in the grid-like pallet for firing the ceramic shaped products, product holder plates (42a–42c) lying on the support surface of said pallets at least within said through tunnel (12), said pallets being movable along a closed loop path extending through said through tunnel (12) and having an external section outside said through tunnel (12), at least one discharge station (52), at least one exchange station (54) and at least one feed station (56, 58, 60) being located along said external section, fired ceramic shaped products (44a–44c) being discharged from said product holder plates (42a–42c) on said pallets at said discharge station (52), the product holder plates (42a–42c) being replaced on said pallets at said exchange station and unfired ceramic shaped products being placed on said product holder plates (42a–42c) at said feed station (56, 58, 60), said discharge station (52), said exchange station (54) and said feed station (56, 58, 60) being arranged in a series corresponding to the sequence of the above enumeration between an exit end of said through tunnel (12) and an entrance end of said through tunnel (12), at least one discharge conveyor (52ba–52bc) extending from said external section at said discharge station (52), at least one exchange conveyor extending from said external section at said exchange station (54), at least one feed conveyor extending from said external section at said feed station (56, 58, 60), said conveyors extending from said external section in a direction substantially perpendicular to said external section in the respective stations, each said station being equipped with a manipulator unit (52a), said manipulator unit (52a) comprising a bridge (52aa) bridging the respective conveyor (52ba–52bc) and a respective pallet (30) in the respective station (52) and being movable in a direction substantially perpendicular to said external section in the respective station (52) such as to be movable across an end portion of the respective conveyor (52ba–52bc) and the total extent of the respective pallet (30) in the respective station (52) perpendicular to the external section in the respective station, a manipulator head (52ab) being movable on said bridge (52aa) in a direction substantially parallel to said external section in the respective station (52), said manipulator head (52ab) being movable to any location of said pallet (30) in the respective station (52) due to the combined movement of said bridge (52aa), perpendicular to said external section and due to movement of said manipulator head (52ab) along said bridge (52aa).

2. Apparatus for firing ceramic shaped products comprising a kiln (10) provided with a through tunnel (12) and heating means (18, 20) for heating the through tunnel and providing a firing atmosphere, grid-like pallets (309) having a support surface carrying the ceramic shaped products (44a–44c) during the passage of the pallets through the through tunnel (12) and said support surfaces having openings therethrough so that the firing atmosphere flows through the openings in the grid-like pallet for firing the ceramic shaped products, product holder plates (42a–42c) lying on the support surface of said pallets (30), feed means (56, 58, 60) for feeding the unfired ceramic shaped products onto the product holder plates (42a–42c) on said pallets, and discharge means for discharging the fired ceramic shaped products (44a–44c) from the product holder plates (42a–42c) on said pallets, said grid-like pallets (30) comprising a plurality of bridge beams (34) extending substantially transverse to a longitudinal direction of said through tunnel (12) and a plurality of interconnection beams (38) extending between adjacent said bridge beams (34), end portions of said bridge beams (34) being carried by respective bridge carrier trucks (24a) movable along respective side walls of said through tunnels (12), said product holder plates (42a–42c) being placed on said interconnection beams (38) and said bridge beams and interconnecting beams defining the openings through the support surface.

3. Apparatus as set forth in claim 2, wherein said bridge beams (34) being hollow sections formed of recrystallized silicon carbide, and said interconnection beams (38) being hollow sections formed of silicon carbide sintered without pressure.

4. Apparatus for firing ceramic shaped products comprising a kiln (10) provided with a through tunnel (12) and heating means (18, 20) for heating and providing a firing atmosphere, open grid-like pallets (30) having a planar support surface carrying the ceramic shaped products (44a–44c) during the passage of the pallets through the through tunnel (12) and said support surface having a lattice-like structure forming openings therethrough so that the firing atmosphere flows through the openings in the grid-like pallet for firing the ceramic shaped products, annular planar product holder plates (42a–42c) lying on the support surface of said pallets at least within said through tunnel (12), and said annular holder plates forming openings in communications with the openings in said pallets, said pallets being movable along a closed loop path extending through said through tunnel (12) and having an external section outside said through tunnel (12), at least one discharge station (52), at least one exchange station (54) and at least one feed station (56, 58, 60) being located along said external section, fired ceramic shaped products (44a–44c) being discharged form said product holder plates (42a–42c) on said pallets at said discharge station (52), the product holder plates (42a–42c) being replaced on said pallets at said exchange station and unfired ceramic shaped products being placed on said product holder plates (42a–42c) at said feed station (56, 58, 60), said discharge station (52), said exchange station (54) and said feed station (56, 58, 60) being arranged in a series corresponding to the sequence of the above enumeration between an exit end of said through tunnel (12) and an entrance end of said through tunnel (12), at least one discharge conveyor (52ba–52bc) extending from said external section at said discharge station (52), at least one exchange conveyor extending from said external section at said exchange station (54), at least one feed conveyor extending from said external section at said feed station (56, 58, 60), said conveyors extending from said external section in a direction substantially perpendicular to said external section in the respective stations, each said station being equipped with a mechanically operable manipulator unit (52a), said manipulator unit (52a) comprising a bridge (52aa) bridging the respective conveyor (52ba–52bc) and a respective pallet (30) in the respective station (52) and being movable in a direction substantially perpendicular to said external section in the respective station (52) such as to be movable across an end portion of the respective conveyor (52ba–52bc) and the total extent of the respective pallet (30) in the respective station (52) perpendicular to the external section in the respective station, a mechanically operable manipulator head (52ab) being movable on said bridge (52aa) in a direction substantially parallel to said external section in the respective station (52), said manipulator head (52ab) being movable to any location of said pallet (30) in the respective station (52) due to the combined movement of said bridge (52aa), perpendicular to said external section and due to movement of said manipulator head (52ab) along said bridge (52aa).

5. Apparatus for firing ceramic shaped products comprising a kiln (10) provided with a through tunnel (12) and heating means (18, 20) for heating the through tunnel and providing a firing atmosphere, open grid-like pallets (309) having a support surface carrying the ceramic shaped products (44a–44c) during the passage of the pallets through the through tunnel (12) and said support surfaces having a lattice-like structure forming openings therethrough so that the firing atmosphere flows through the openings in the grid-like pallet for firing the ceramic shaped products, annular planar product holder plates (42a–42c) lying on the support surface of said pallets (30) and said annular holder plates forming openings in communication with the openings in said pallets, mechanically operable feed means (56, 58, 60) for feeding the unfired ceramic shaped products onto the product holder plates (42a–42c) on said pallets, and mechanically operable discharge means for discharging the fired ceramic shaped products (44a–44c) from the product holder plates (42a–42c) on said pallets, said grid-like pallets (30) comprising a plurality of bridge beams (34) extending substantially transverse to a longitudinal direction of said through tunnel (12) and a plurality of interconnection beams (38) extending between adjacent said bridge beams (34), end portions of said bridge beams (34) being carried by respective bridge carrier trucks (24a) movable along respective side walls of said through tunnels (12), said product holder plates (42a–42c) being placed on said interconnection beams (38) and said bridge beams and interconnecting beams defining the openings through the support surface of said pallet.

6. Apparatus for firing ceramic shaped products comprising a kiln (10) provided with a through tunnel (12) and heating means (18) for heating the through tunnel and providing a firing atmosphere, grid-like pallets (30) forming a support surface for carrying the ceramic shaped products (44a–44c) during the passage of the pallets through the through tunnel (12) and said support surface having openings therethrough so that the firing atmosphere flows through the openings in the grid-like pallet for firing the ceramic shaped products, product holder plates (42a–42c) lying on said pallets, feed means upstream in the passage of the pallets from an entrance to said through tunnel for feeding unfired ceramic shaped products (44a–44c) onto the product holder plates (42a–42c) on said pallets (30), discharge means downstream in the passage of the pallets from an exit from said through tunnel for discharging fired ceramic shaped products from the product holder plates (42a–42c) on said pallets (30), and said product holder plates formed of silicon carbide sintered without pressure at least 2,000° C.

7. Apparatus for firing ceramic shaped products comprising a kiln (10) provided with a through tunnel (12) and heating means (18) for heating the through tunnel and providing a firing atmosphere, open grid-like pallets (30) forming a planar support surface for carrying the ceramic shaped products (44a–44c) during the passage of the pallets through the through tunnel (12) and said support surface having a lattice-like structure forming openings therethrough so that the firing atmosphere flows through the openings in the grid-like pallet for firing the ceramic shaped products, annular planar product holder plates (42a–42c) positioned on said support surface on said pallets and said annular holder plates forming openings in communication with the openings in said pallets, mechanical feed means upstream in the passage of the pallets from an entrance to said through tunnel for feeding unfired ceramic shaped products (44a–44c) onto the product holder plates (42a–42c) on said pallets (30), mechanical discharge means downstream in the passage of the pallets from an exit from said through tunnel for discharging fired ceramic shaped products from the product holder plates (42a–42c) on said pallets (30), and said product holder plates formed of silicon carbide sintered without pressure at least 2,000° C.

8. Apparatus as claimed in claim 6, or 7, in which the product holder plates are plane parallel plates having an opening therethrough arranged to communicate with openings in said pallet.

9. Apparatus as claimed in claim 6, in which the product holder plates are each intended to hold a single shaped product.

10. Apparatus as claimed in claim 6 in which the product holder plates are approximately adapted in respect of their outer contour to a foot contour of the shaped product.

11. Apparatus as claimed in claim 10 in which the product holder plates are annular in shape.

12. Apparatus as claimed in claim 11, in which the inner contour of the annular product holder plates is in each case approximately adapted to the contour of the foot of the shaped product.

13. Apparatus as claimed in claim 6 in which the contour shape of the product holder plates is approximately adapted to the contour shape of the respective shaped product.

14. Apparatus as claimed in claim 6, in which the product holder plates are circular.

15. Apparatus as claimed in claim 6, in which the product holder plates are adapted to be laid on a respective planar pallet surface in such a manner that a maximum number of shaped products can be accommodated.

16. Apparatus as claimed in claim 6, in which each pallet is supported like a bridge on two pallet carrier trucks each of which runs near a side boundary wall of the through tunnel, said trucks each comprising a wheeled chassis and a refractory body, the refractory body of the pallet carrier truck, in order to protect the chassis, adjoining a central refractory structure between the pallet carrier trucks and also adjoining refractory structures of the side walls of the kiln, this arrangement forming a heat shield.

17. Apparatus as claimed in claim 16 in which the central refractory structure is in the form of a part of a plurality of tunnel bottom carrier trucks each of which has a tunnel bottom carrier chassis.

18. Apparatus as claimed in claim 6 or 7, in which the width of the through tunnel amounts to at least 2000 mm.

19. Apparatus as claimed in claim 6 or 7, in which the clear height of the through tunnel above the pallets is selected so that, with a single layer of shaped products on the pallets and with lateral heating by the side walls of the kiln, an approximately uniform firing atmosphere distribution in the entire through tunnel cross-section can be achieved.

20. Apparatus as claimed in claim 6 or 7 in which the heating means comprises burners adjustable horizontally and transversely to the longitudinal direction of the through tunnel, both above and below the pallets.

21. Apparatus as claimed in claim 6, wherein said product holder plates (42a–42c) being isostatically pressed at at least 1,500 bars before sintering without pressure at at least 2,000° C.

22. Apparatus for firing ceramic shaped products comprising a kiln (10) provided with a through tunnel (12) and hearting means (18, 20) for heating the through tunnel and providing a firing atmosphere, grid-like pallets (30) having a support surface for carrying the ceramic shaped products (44a–44c) during the passage of the pallets through the through tunnel (12) and said support surface having openings therethrough so that the firing atmosphere flows through the openings in the grid-like pallet for firing the ceramic shaped products, product holder plates having a planar support surface (42a–42c) lying on the support surface of said pallets, feed means (56, 58, 60) for feeding unfired ceramic shaped products (44a–44c) onto the product holder plates (42a–42c) on the planar support surfaces thereof, and discharge means for discharging fired ceramic shaped products from the product holder plates (42a–42c) and at least one of said grid-like pallets (30) carrying product holder plates (42a–42c) of the different sizes, including smaller product holder plates, (42c) for receiving correspondingly smaller ceramic shaped products (44c) and larger products holder plates (42a) for receiving correspondingly larger ceramic shaped products (44a).

23. Apparatus for firing ceramic shaped products comprising a kiln (10) provided with a through tunnel (12) and heating means (18, 20) for heating the through tunnel and providing a firing atmosphere, open grid-like pallets (30) having a planar support surface for carrying the ceramic shaped products (44a–44c) during the passage of the pallets through the through tunnel (12) and said support surface having a lattice-like structure forming openings therethrough so that the firing atmosphere flows through the openings in the grid-like pallet for firing the ceramic shaped products, annular product holder plates having a planar support surface (42a–42c) lying on the support surface of said pallets and forming openings communicating with the openings in said pallet, mechanical feed means (56, 58, 60) for feeding unfired ceramic shaped products (44a–44c) onto the product holder plates (42a–42c) on the planar support surfaces thereof, and mechanical discharge means for discharging fired ceramic shaped products from the product holder plates (42a–42c) and at least one of said grid-like pallets (30) carrying product holder plates (42c) for receiving smaller ceramic shaped products and larger product holder plates for receiving correspondingly larger ceramic shaped products (44a).

24. Apparatus as claimed in claim 22 or 23, in which the product holder plates comprises silicon carbide.

25. Apparatus as claimed in claim 24, in which the product holder plates comprises silicon carbide which has been sintered without pressure at at least 2000° C.

26. Apparatus as claimed in claim 24, in which the product holder plates are isostatically pressed at at least 1500 bars.

* * * * *